(12) United States Patent
Oka et al.

(10) Patent No.: US 11,440,546 B2
(45) Date of Patent: Sep. 13, 2022

(54) TRAVEL CONTROL APPARATUS, VEHICLE, TRAVEL CONTROL METHOD, AND NON-TRANSITORY COMPUTER-READABLE STORAGE MEDIUM

(71) Applicant: HONDA MOTOR CO., LTD., Tokyo (JP)

(72) Inventors: Keisuke Oka, Wako (JP); Yuki Kizumi, Wako (JP); Takashi Mine, Wako (JP); Masahiko Asakura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/167,135

(22) Filed: Feb. 4, 2021

(65) Prior Publication Data
US 2021/0245753 A1    Aug. 12, 2021

(30) Foreign Application Priority Data
Feb. 12, 2020    (JP) .............................. JP2020-021864

(51) Int. Cl.
*B60W 30/18*    (2012.01)
*G08G 1/16*    (2006.01)
*G06V 20/56*    (2022.01)

(52) U.S. Cl.
CPC ..... *B60W 30/18009* (2013.01); *G06V 20/588* (2022.01); *G08G 1/166* (2013.01);
(Continued)

(58) Field of Classification Search
CPC ........... B60W 30/16; B60W 30/18009; B60W 2552/10; B60W 2552/53;
(Continued)

(56) References Cited

U.S. PATENT DOCUMENTS 9,733,642 B2    8/2017 Hashimoto et al.
10,625,781 B2    4/2020 Kataoka
(Continued)

FOREIGN PATENT DOCUMENTS

JP    2010-023721 A    2/2010
JP    2016-038838 A    3/2016
(Continued)

OTHER PUBLICATIONS

Japanese Notice of Grant (with partial translation) for Japanese Patent Application No. 2020-021864 dated Aug. 27, 2021.

*Primary Examiner* — Anshul Sood
(74) *Attorney, Agent, or Firm* — Thomas | Horstemeyer, LLP

(57) ABSTRACT

There is provided a travel control apparatus. A control unit controls a position of the self-vehicle in a width direction so as to ensure a first predetermined interval between the self-vehicle and the other vehicle and to ensure a second predetermined interval between the self-vehicle and the boundary of the first lane. In a case in which both the first predetermined interval and the second predetermined interval cannot be ensured, the control unit controls the position of the self-vehicle in the width direction to preferentially ensure the first predetermined interval when the other vehicle has crossed a first boundary between the first lane and the second lane and to preferentially ensure the second predetermined interval when the other vehicle has not crossed the first boundary.

12 Claims, 9 Drawing Sheets

(52) U.S. Cl.
CPC ......... *G08G 1/167* (2013.01); *B60W 2552/10* (2020.02); *B60W 2552/53* (2020.02); *B60W 2554/4041* (2020.02); *B60W 2554/801* (2020.02); *B60W 2554/802* (2020.02); *B60W 2754/20* (2020.02); *B60W 2754/30* (2020.02)

(58) Field of Classification Search
CPC ... B60W 2554/4041; B60W 2554/801; B60W 2554/802; B60W 2754/20; B60W 2754/30; G06V 20/588; G08G 1/166; G08G 1/167
See application file for complete search history.

(56) References Cited

U.S. PATENT DOCUMENTS

| | | | |
|---|---|---|---|
| 2005/0228588 A1* | 10/2005 | Braeuchle | B62D 15/025 |
| | | | 701/301 |
| 2016/0259334 A1 | 9/2016 | Hashimoto et al. | |
| 2017/0240184 A1* | 8/2017 | Kluever | G08G 1/165 |
| 2018/0148093 A1 | 5/2018 | Kataoka | |
| 2020/0180618 A1* | 6/2020 | Ohmura | B60W 60/0015 |
| 2021/0339748 A1* | 11/2021 | Spieker | B60W 60/001 |

FOREIGN PATENT DOCUMENTS

| | | |
|---|---|---|
| JP | 2016-162229 A | 9/2016 |
| JP | 2018-086980 A | 6/2018 |
| JP | 2019-147437 A | 9/2019 |

* cited by examiner

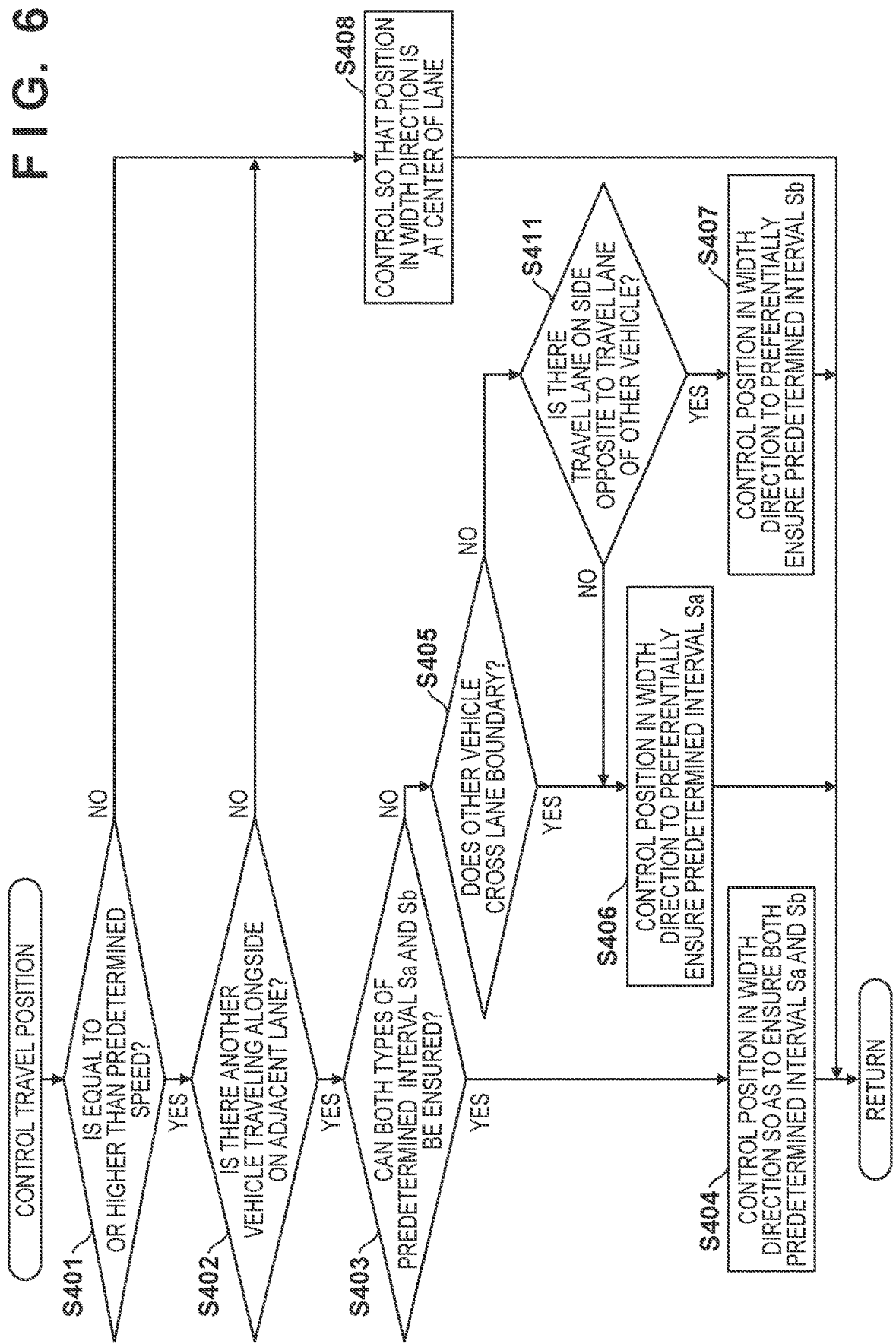

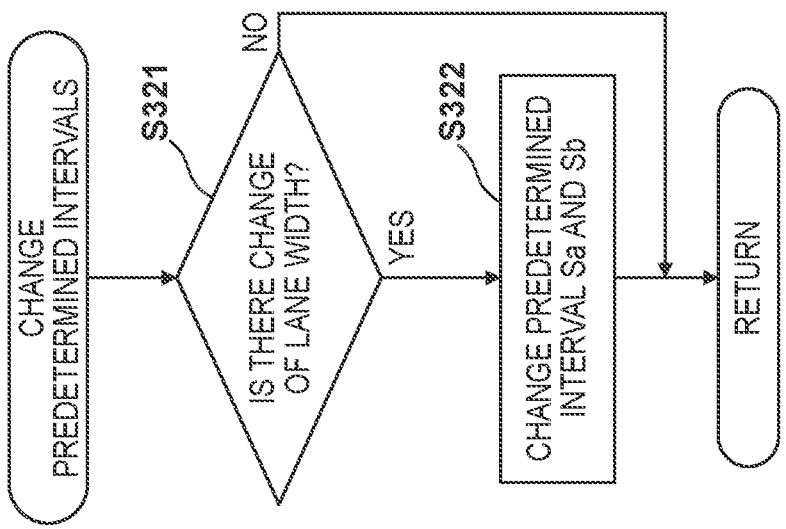
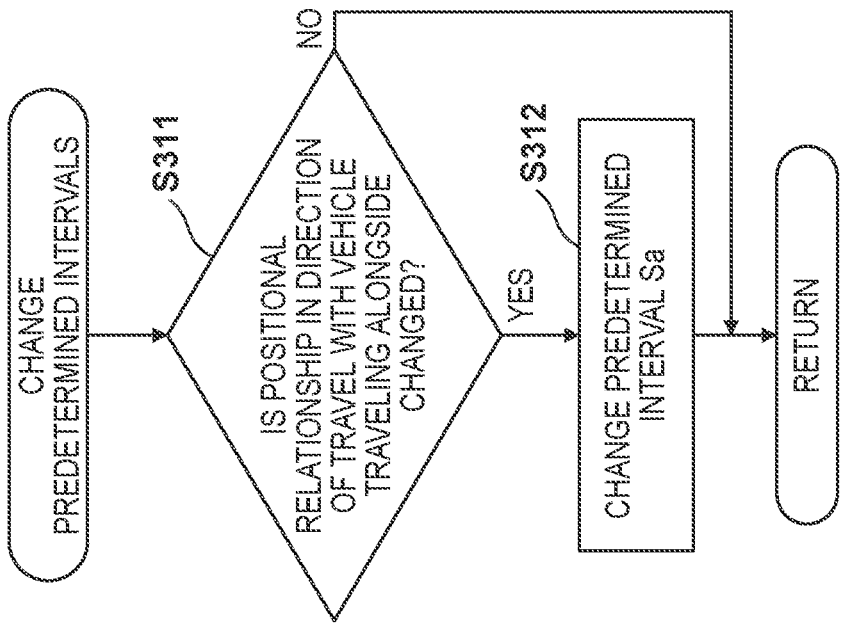
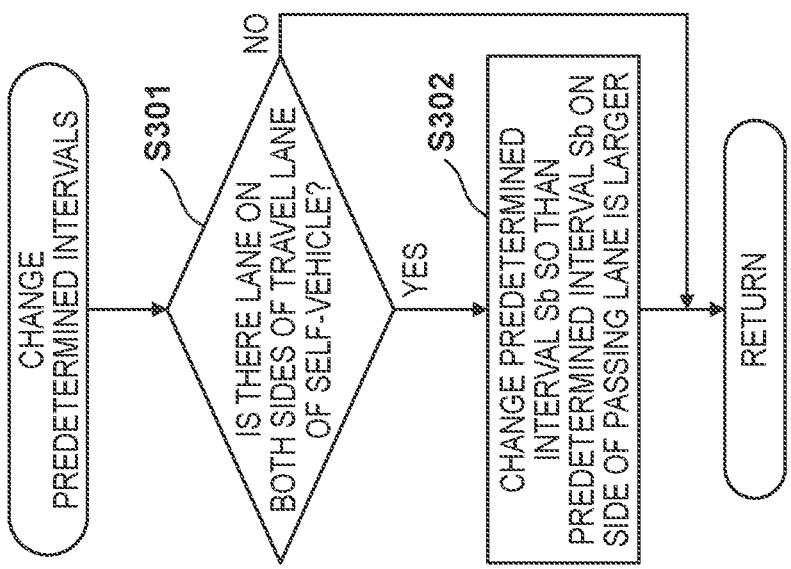

TRAVEL CONTROL APPARATUS, VEHICLE, TRAVEL CONTROL METHOD, AND NON-TRANSITORY COMPUTER-READABLE STORAGE MEDIUM

CROSS-REFERENCE TO RELATED APPLICATION(S)

This application claims priority to and the benefit of Japanese Patent Application No. 2020-021864 filed on Feb. 12, 2020, the entire disclosure of which is incorporated herein by reference.

BACKGROUND OF THE INVENTION

Field of the Invention

The present invention relates to a travel control apparatus, a vehicle, a travel control method, and a non-transitory computer-readable storage medium.

Description of the Related Art

There is disclosed a travel control apparatus that performs control so that a distance between a target vehicle and a self-vehicle will increase in a case in which the target vehicle has changed course to a direction toward the self-vehicle (Japanese Patent Laid-Open No. 2016-38838).

SUMMARY OF THE INVENTION

According to one embodiment of the present invention, there is provided a travel control apparatus comprising: a first recognition unit configured to recognize another vehicle present on a second lane which is adjacent to a first lane on which a self-vehicle is traveling; a second recognition unit configured to recognize a boundary of the first lane; and a control unit configured to control, in a case in which the self-vehicle and the other vehicle are traveling alongside each other, a position of the self-vehicle in a width direction so as to ensure a first predetermined interval between the self-vehicle and the other vehicle and to ensure a second predetermined interval between the self-vehicle and the boundary of the first lane, wherein in a case in which both the first predetermined interval and the second predetermined interval cannot be ensured, the control unit controls the position of the self-vehicle in the width direction to preferentially ensure the first predetermined interval when the other vehicle has crossed a first boundary between the first lane and the second lane and to preferentially ensure the second predetermined interval when the other vehicle has not crossed the first boundary.

According to another embodiment of the present invention, there is provided a travel control method comprising: recognizing another vehicle present on a second lane which is adjacent to a first lane on which a self-vehicle is traveling; recognizing a boundary of the first lane; and controlling, in a case in which the self-vehicle and the other vehicle are traveling alongside each other, a position of the self-vehicle in a width direction so as to ensure a first predetermined interval between the self-vehicle and the other vehicle and to ensure a second predetermined interval between the self-vehicle and the boundary of the first lane, wherein in a case in which both the first predetermined interval and the second predetermined interval cannot be ensured, the position of the self-vehicle in the width direction is controlled in the controlling to preferentially ensure the first predetermined interval when the other vehicle has crossed a first boundary between the first lane and the second lane and to preferentially ensure the second predetermined interval when the other vehicle has not crossed the first boundary.

According to still another embodiment of the present invention, there is provided a non-transitory computer-readable storage medium storing a program for causing a computer of a travel control apparatus to function as each unit of a first recognition unit configured to recognize another vehicle present on a second lane which is adjacent to a first lane on which a self-vehicle is traveling; a second recognition unit configured to recognize a boundary of the first lane; and a control unit configured to control, in a case in which the self-vehicle and the other vehicle are traveling alongside each other, a position of the self-vehicle in a width direction so as to ensure a first predetermined interval between the self-vehicle and the other vehicle and to ensure a second predetermined interval between the self-vehicle and the boundary of the first lane, wherein in a case in which both the first predetermined interval and the second predetermined interval cannot be ensured, the control unit controls the position of the self-vehicle in the width direction to preferentially ensure the first predetermined interval when the other vehicle has crossed a first boundary between the first lane and the second lane and to preferentially ensure the second predetermined interval when the other vehicle has not crossed the first boundary.

BRIEF DESCRIPTION OF THE DRAWINGS

FIG. 6 is a flowchart showing an example of processing by the ECU;

FIG. 9A is a flowchart showing an example of processing by the ECU.

FIG. 9B is a flowchart showing an example of processing by the ECU.

FIG. 9C is a flowchart showing an example of processing by the ECU.

DESCRIPTION OF THE EMBODIMENTS

Figure 1:
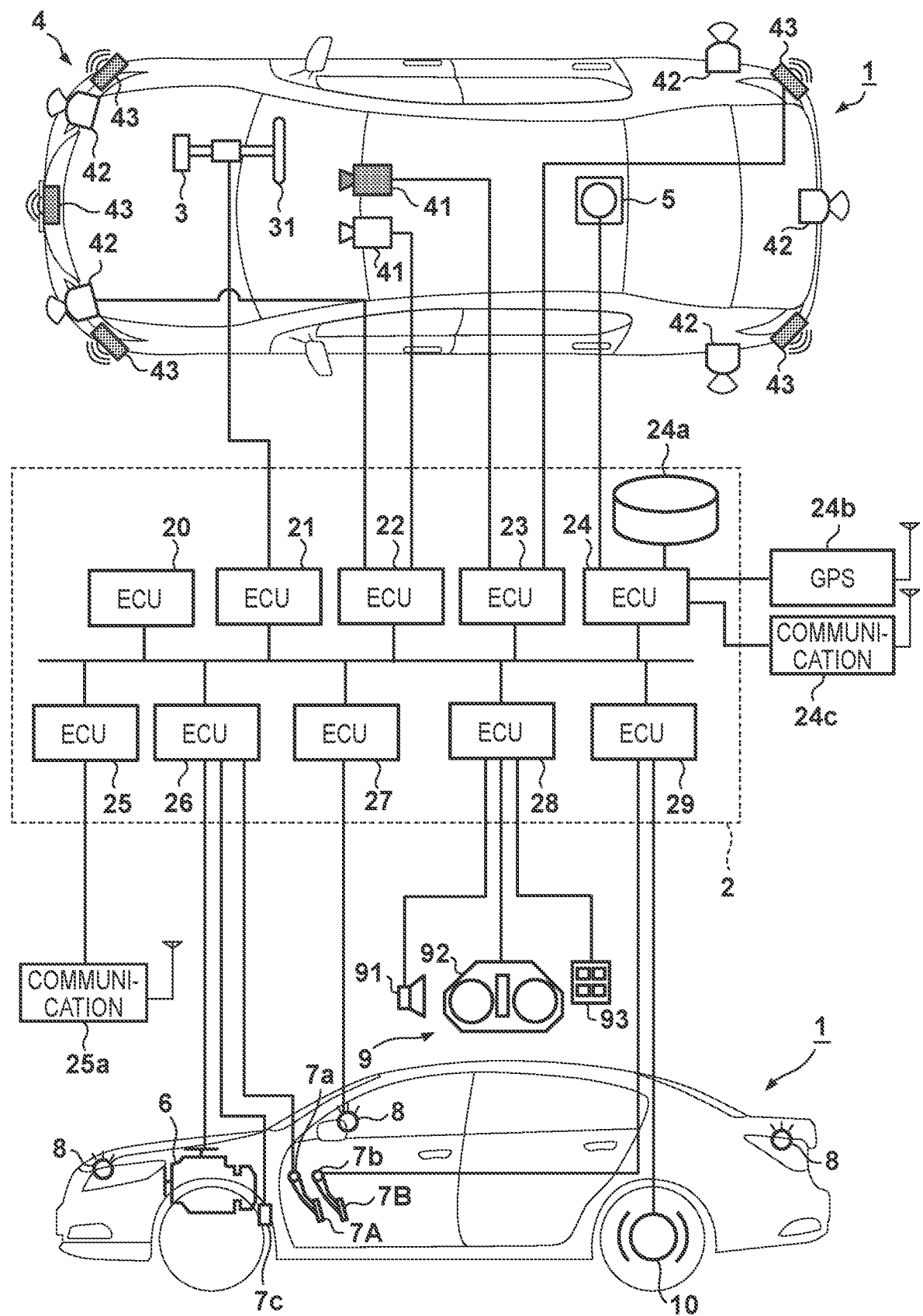
FIG. 1 is a block diagram of a vehicle control apparatus according to an embodiment.

In the conventional technique described above, a distance between a self-vehicle and a target vehicle in a vehicle width direction is controlled in response to a lane change by another vehicle. However, a distance, in the vehicle width direction, between the self-vehicle and a vehicle which is already traveling in a travel lane adjacent to a travel lane of the self-vehicle is not set as the target of control.

An embodiment of the present invention provides a technique that can more suitably control an interval between a self-vehicle and another vehicle traveling in an adjacent lane.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

<First Embodiment>

FIG. 1 is a block diagram of a vehicle control apparatus according to an embodiment of the present invention and controls a vehicle 1. FIG. 1 shows the outline of the vehicle 1 by a plan view and a side view. The vehicle 1 is, for example, a sedan-type four-wheeled vehicle. Note that in the following description, the left and right directions are based on a state facing the direction of forward movement of the vehicle 1.

A vehicle control apparatus of FIG. 1 includes a control unit 2. The control unit 2 includes a plurality of ECUs 20 to 29 communicably connected by an in-vehicle network. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. In addition, each ECU may include a dedicated integrated circuit such as an ASIC or the like for executing the processing of each ECU instead of these components.

The functions and the like provided by the ECUs 20 to 29 will be described below. Note that the number of ECUs and the provided functions can be appropriately designed, and they can be subdivided or integrated as compared to this embodiment.

The ECU 20 executes control associated with automated driving of the vehicle 1. In automated driving, at least one of steering and acceleration/deceleration of the vehicle 1 is automatically controlled. In a control example to be described later, the ECU 20 will control a position of the vehicle 1 in the width direction by automatically controlling at least one of steering and acceleration/deceleration of the vehicle. In this manner, from one aspect, the ECU 20 can be called a travel control apparatus of the vehicle 1.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a driving force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls the direction of travel of the vehicle 1.

The ECUs 22 and 23 perform control of detection units 41 to 43 that detect the peripheral state of the vehicle and information processing of detection results. Each detection unit 41 is a camera (to be sometimes referred to as the camera 41 hereinafter) that captures the front side of the vehicle 1. In this embodiment, the cameras 41 are attached to the windshield inside the vehicle cabin at the front of the roof of the vehicle 1. When images captured by the cameras 41 are analyzed, the contour of a target or a division line (a white line or the like) of a lane on a road can be extracted.

The detection unit 42 is Light Detection and Ranging (LiDAR) (to be sometimes referred to as the LiDAR 42 hereinafter), and detects a target around the vehicle 1 or measures the distance to a target. In this embodiment, five LiDARs 42 are provided; one at each corner of the front portion of the vehicle 1, one at the center of the rear portion, and one on each side of the rear portion. The detection unit 43 is a millimeter wave radar (to be sometimes referred to as the radar 43 hereinafter), and detects a target around the vehicle 1 or measures the distance to a target. In this embodiment, five radars 43 are provided; one at the center of the front portion of the vehicle 1, one at each corner of the front portion, and one at each corner of the rear portion.

The ECU 22 performs control of one camera 41 and each LIDAR 42 and information processing of detection results. The ECU 23 performs control of the other camera 41 and each radar 43 and information processing of detection results. Since two sots of devices that detect the peripheral state of the vehicle are provided, the reliability of detection results can be improved. In addition, since detection units of different types such as cameras, LIDARs, radars, and sonars are provided, the peripheral environment of the vehicle can be analyzed multilaterally.

The ECU 24 performs control of a gyro sensor 5, a GPS sensor 24b, and a communication device 24c and information processing of detection results or communication results. The gyro sensor 5 detects a rotary motion of the vehicle 1. The course of the vehicle 1 can be determined based on the detection result of the gyro sensor 5, the wheel speed, or the like. The GPS sensor 24b detects the current position of the vehicle 1. The communication device 24c performs wireless communication with a server that provides map information and traffic information and acquires these pieces of information. The ECU 24 can access a map information database 24a formed in the storage device. The ECU 24 searches for a route from the current position to the destination.

The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a driving force to rotate the driving wheels of the vehicle 1 and includes, for example, an engine and a transmission. The ECU 26, for example, controls the output of the engine in correspondence with a driving operation (accelerator operation or acceleration operation) of the driver detected by an operation detection sensor 7a provided on an accelerator pedal 7A, or switches the gear ratio of the transmission based on information such as a vehicle speed detected by a vehicle speed sensor 7c. If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, and the like) including direction indicators 8 (turn signals). In the example shown in FIG. 1, the direction indicators 8 are provided in the front portion, door mirrors, and the rear portion of the vehicle 1.

The ECU 28 controls an input/output device 9. The input/output device 9 outputs information to the driver and accepts input of information from the driver. A voice output device 91 notifies the driver of the information by voice (words). A display device 92 notifies the driver of information by displaying an image. The display device 92 is arranged, for example, in front of the driver's seat and constitutes an instrument panel or the like. Note that although notification by voice and display have been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a brake device TO and a parking brake (not shown). The brake device 10 is, for example, a disc brake device which is provided for each wheel of the vehicle 1 and decelerates or stops the vehicle 1 by applying a resistance to the rotation of the wheel. The ECU 29, for example, controls the operation of the brake device 10 in correspondence with a driving operation (brake operation) of the driver detected by an operation detection sensor 7b provided on a brake pedal 7B. If the driving state of the vehicle 1 is automated driving, the ECU 29 automatically controls the brake device 10 in correspondence with an instruction from the ECU 20 and controls deceleration and stop of the vehicle 1. The brake device 10 or the parking brake can also be operated to maintain the stationary state of the vehicle 1. In addition, if the transmission of the power plant 6 includes a parking lock mechanism, it can be operated to maintain the stationary state of the vehicle 1.

<Control Example of Position Control in Width Direction>

Figure 2:
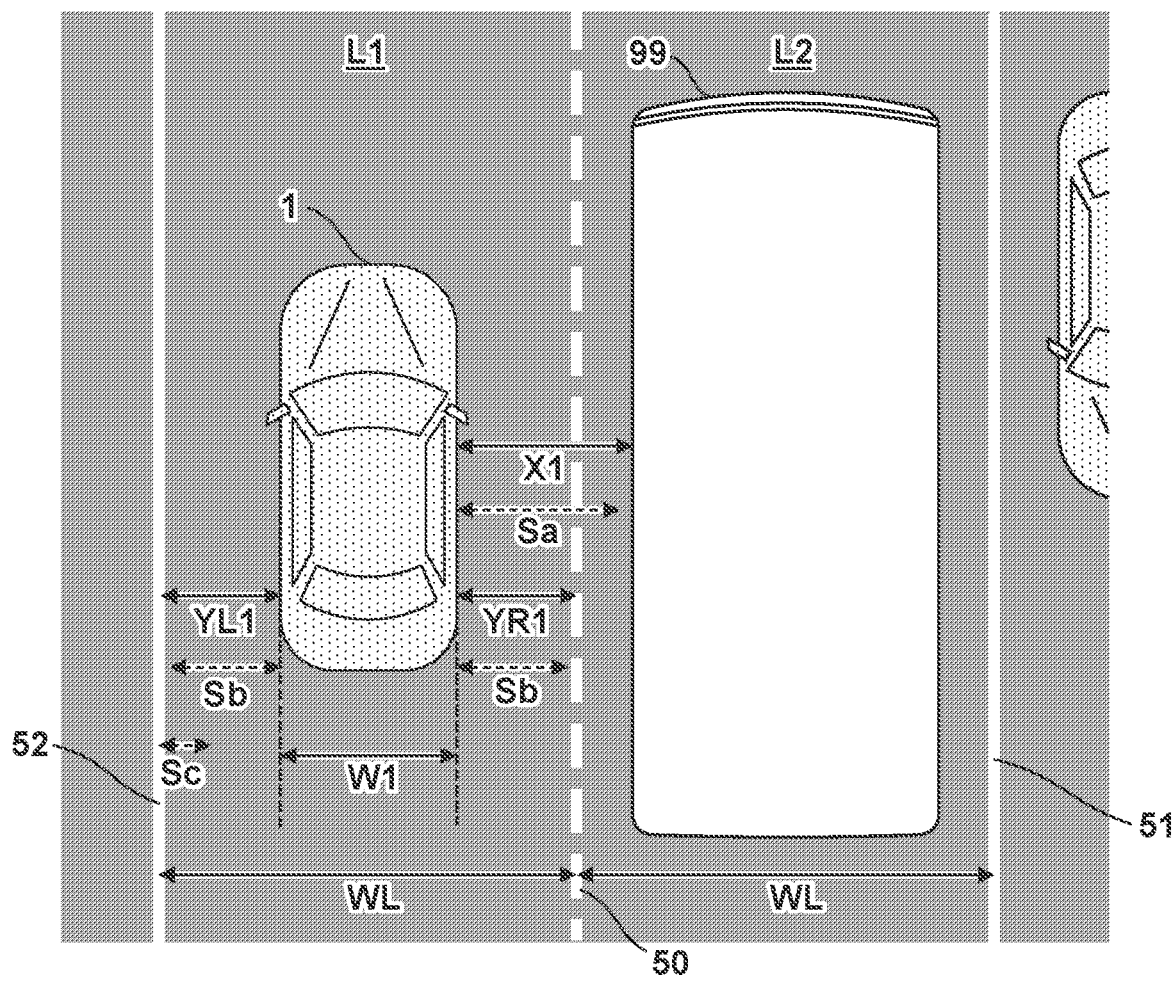
FIG. 2 is a view schematically showing the positional relationship between a vehicle, another vehicle traveling alongside the vehicle, and each division line.

An example of control related to automated driving of the vehicle 1 executed by the ECU 20 will be described. More specifically, an example of position control of the vehicle 1 in the width direction by the ECU 20 will be described. FIG. 2 is a view schematically showing the positional relationship between the vehicle 1, another vehicle 99 which is traveling alongside the vehicle 1, and each division line.

The road on which the vehicle 1 is traveling is a four lane road, and includes a lane L1 on which the vehicle 1 is traveling and a lane L2 on which the other vehicle is traveling. In this example, the lane L1 is a lane (travel lane) on the outer side of the road, and the lane L2 is a lane (passing lane) on the center side of the road.

In addition, a lane boundary line 50, a road center line 51, and a road edge line 52 are drawn as division lines on the road. The lane boundary line 50 is the so-called lane markings and delimits the boundary between the lane L1 and the lane L2. In addition, the road center line 51 delimits the boundary between the lane L2 and an oncoming lane. The road edge line 52 delimits the boundary between the road and its outside, that is, it delimits the road boundary. The outside of the road edge line 52 can be the shoulder, a sidewalk, or the like. Note that although the road edge line 52 delimits the boundary between the road and its outside in this embodiment, the boundary between the road and its outside is not limited to such a division line and may be delimited by, for example, a guardrail, a step, or the like.

In the example shown in FIG. 2, each of the lane L1 and the lane L2 has a width indicated by a lane width WL. Also, the vehicle width of the vehicle 1 is a vehicle width W1 which is smaller than the lane width WL. Also, the vehicle 1 and the other vehicle 99 traveling alongside the vehicle 1 are traveling with an interval, which is indicated as an actual interval X1, between them. The vehicle 1 is also traveling with an interval, which is indicated as an actual interval YR1, between its right side portion and the lane boundary line 50. The vehicle 1 is also traveling with an interval, which is indicated as an actual interval YL1, between its left side portion and the road edge line 52. The actual interval YR1=the actual interval YL1 in the example shown in FIG. 2.

Also, although it will be described in detail later, the ECU 20 will control the position of the vehicle 1 in the width direction to ensure a predetermined interval Sa and predetermined intervals Sb which have been set based on a predetermined condition when the vehicle 1 is to travel. The predetermined interval Sa is an interval between the vehicle 1 and the other vehicle 99. Also, the predetermined intervals Sb are intervals between the vehicle 1 and the boundaries of the lane L1 on which the vehicle 1 is traveling. More specifically, the predetermined intervals Sb are an interval between the vehicle 1 and the lane boundary line 50 and an interval between the vehicle 1 and the road edge line 52. The ECU 20 basically controls the position of the vehicle 1 in the width direction so as to ensure both the predetermined interval Sa and the predetermined intervals Sb. That is, the ECU 20 controls the actual intervals X1, YL1, and YR1 so that a state in which the actual interval X1≥the predetermined interval Sa, the actual interval YL1≥the predetermined interval Sb, and the actual interval YL1≥predetermined interval Sb will be completely satisfied. In other words, the predetermined intervals Sa and Sb are target values of the actual intervals X1, YL1 and YR1.

Also, as will be described later, one of the intervals may need to be preferentially ensured in some cases when both the predetermined interval Sa and the predetermined intervals Sb cannot be ensured. Even if the predetermined interval Sa is preferentially ensured in such a case, a predetermined interval Sc for ensuring a minimum interval between the boundaries of the road will be set.

In one embodiment, the value of the predetermined interval Sa may fall within a range of 0.5 m to 1.5 m. Also, in one embodiment, the value of each predetermined interval Sb may fall within a range of 0.3 m to 0.7 m. Note that the predetermined interval Sb may be different for the right side and the left side of the vehicle 1. In addition, in one embodiment, the value of the predetermined interval Sc may fall within a range of 0.1 m to 0.3 m.

<Outline of Processing>

Figure 3:
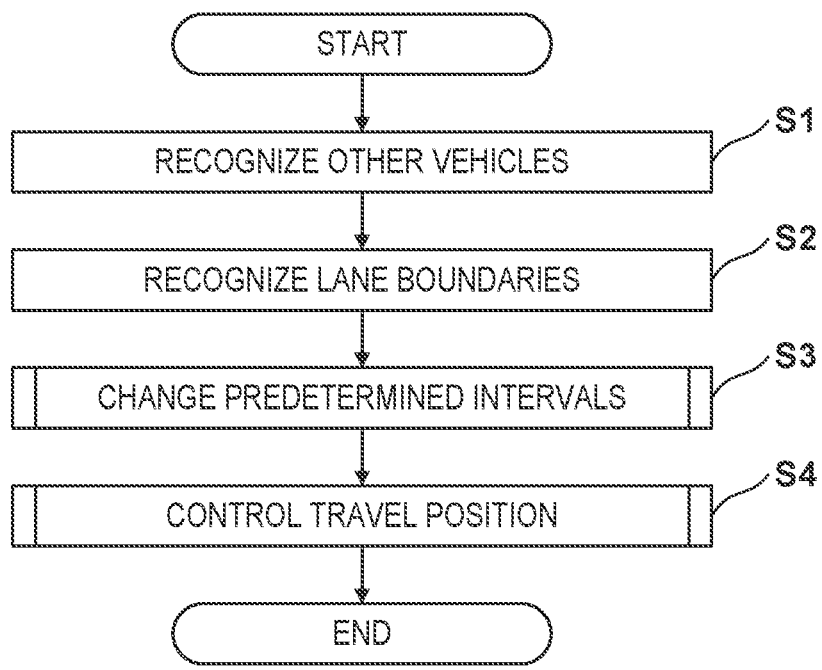
FIG. 3 is a flowchart showing an example of processing by an ECU.

FIG. 3 is a flowchart showing an example of processing by the ECU 20. More specifically, it is a flowchart showing the overall procedure for controlling the position of the vehicle 1 in the width direction by the ECU 20, The processing of FIG. 3 is implemented by, for example, the processor of the ECU 20 executing a program stored in the ECU 20. Alternatively, the processes of the respective steps may be executed by dedicated hardware (for example, a circuit).

In step S1, the ECU 20 executes processing to recognize other vehicles, More specifically, the ECU 20 recognizes the other vehicle 99 that is present in the lane L2 adjacent to the lane L1 on which the vehicle 1 as the self-vehicle is traveling. For example, the ECU 20 recognizes the presence of a vehicle which is traveling, on the lane L2, alongside the vehicle 1 or the interval between the vehicle 1 and the vehicle traveling alongside the vehicle 1 if such a vehicle is present. In terms of the example shown in FIG. 2, the ECU 20 recognizes the presence of the other vehicle 99 and obtains the actual interval X1 between the self-vehicle and the other vehicle 99. In one embodiment, the ECU 20 obtains the presence/absence of the other vehicle 99 and the actual interval X1 based on the detection results of the LiDARs 42 and the radars 43.

Note that the method of determining whether the other vehicle 99, which is traveling on the lane L2 adjacent to the lane L1 on which the vehicle 1 is traveling, is traveling alongside the vehicle 1 can be set appropriately. For example, the ECU 20 can determine that the vehicle 1 is traveling alongside the other vehicle 99 when the vehicle 1 overlaps at least a portion of the other vehicle 99 in a front-and-rear direction. Also, for example, the ECU 20 can determine that the vehicle 1 is traveling alongside the other vehicle 99 in a case in which one of the vehicle 1 and the other vehicle 99 entirely overlaps the other vehicle when viewed in the front-and-rear direction. Also, for example, the ECU 20 may determine that the vehicle 1 is traveling alongside the other vehicle 99 in a case in which a predetermined range of the vehicle 1 in the front-and-rear direction overlaps the other vehicle 99 in the front-and-rear direction. In one embodiment, the vehicle 1 may include a camera whose detection range is set to the lateral side of the vehicle 1, and determine the overlap with the other vehicle 99 by an analysis of the detection result of the camera, that is, an analysis of a captured image.

In step S2, the ECU 20 recognizes the lane boundaries. More specifically, the ECU 20 recognizes the boundaries of the lane L1. In one embodiment, the ECU 20 will recognize, based on the detection result of the cameras 41, the presence of the lane boundary line 50 and the road edge line 52 and obtain the intervals between the vehicle 1 and these lines.

In step S3, the ECU 20 changes the predetermined intervals. The details will be described later. In addition, this step may be omitted.

Furthermore, in step S4, the ECU 20 controls the travel position. More specifically, the ECU 20 controls the position of the vehicle 1 in the width direction. The details will be described later.

<Processing Example 1 of Travel Position Control>

Figure 4:
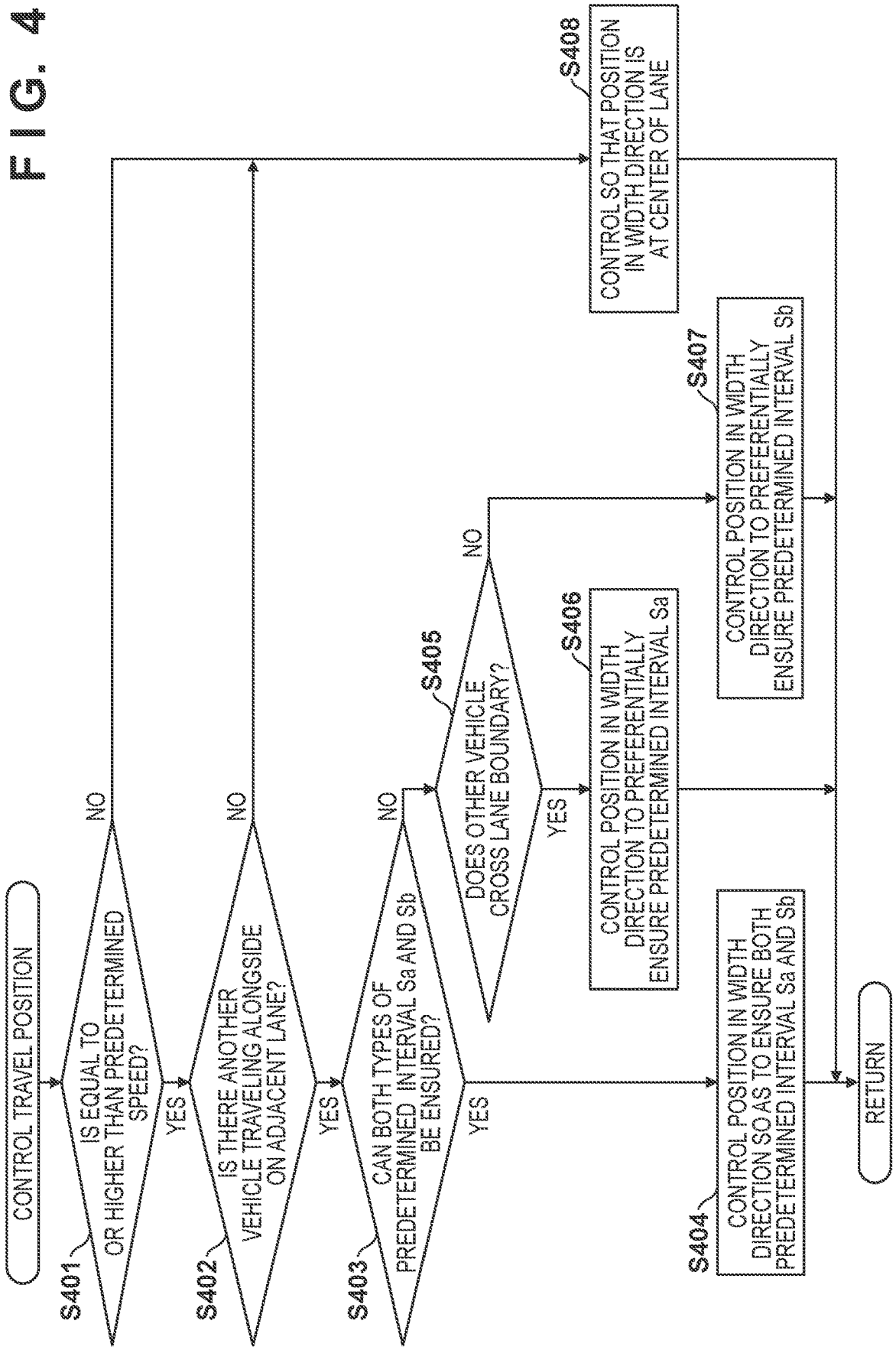
FIG. 4 is a flowchart showing an example of processing by the ECU.
Figure 5B:
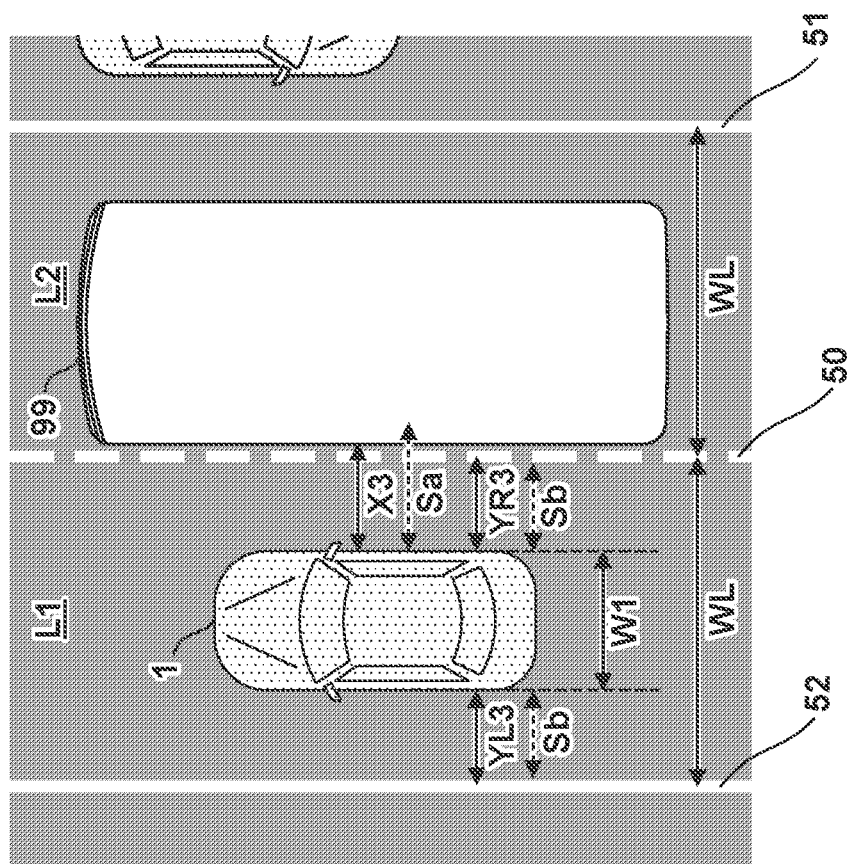
FIG. 5B is a view each schematically showing the positional relationship between the vehicle, the other vehicle traveling alongside the vehicle, and each division line.
Figure 5A:
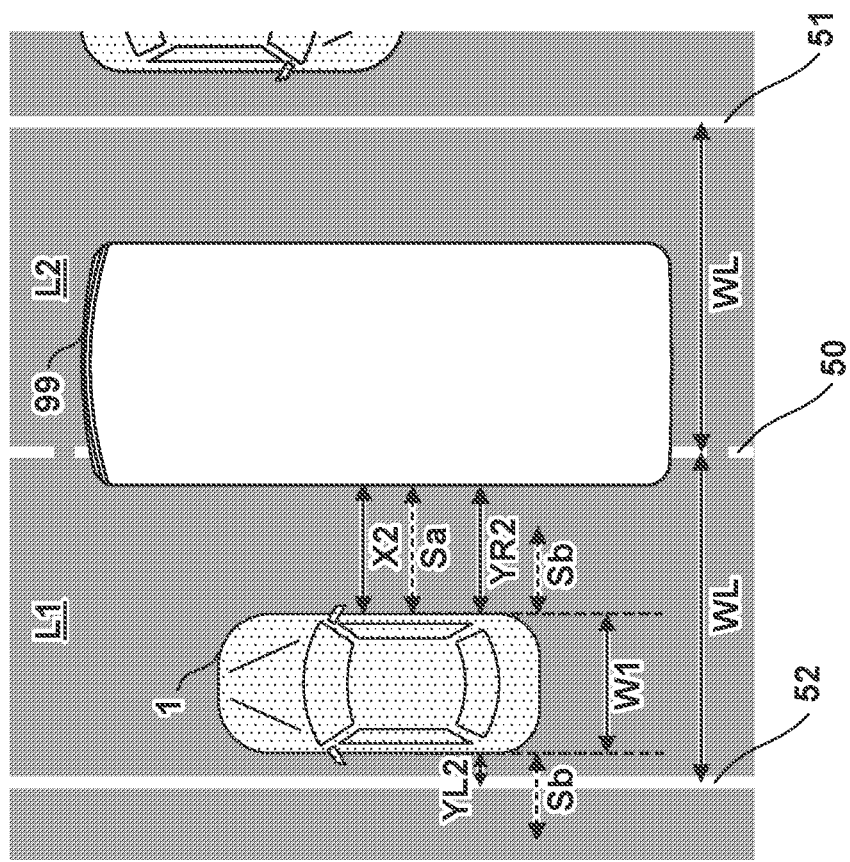
FIG. 5A is a view each schematically showing the positional relationship between the vehicle, the other vehicle traveling alongside the vehicle, and each division line.

FIG. 4 is a flowchart showing an example of processing by the ECU 20, and shows a more specific example of the processing of step S4 of FIG. 3. In addition, FIGS. 5A and 5B are views schematically showing the positional relationship between the vehicle, the other vehicle traveling alongside the vehicle, and each division line. Here. FIG. 5A schematically shows the positional relationship of the vehicle 1 when the process of step S406 of FIG. 4 is performed, and FIG. 5B schematically shows the positional relationship of the vehicle 1 when the process of step D407 is performed.

In a case in which the lane width WL of the lane L2 on which the vehicle 1 is traveling has a predetermined length and the other vehicle 99 traveling alongside the vehicle 1 is maintaining a predetermined distance from the lane boundary line 50, the vehicle 1 can travel while ensuring both the predetermined interval Sa and the predetermined intervals Sb. On the other hand, in a case in which the lane width WL is narrow or the other vehicle 99 has come closer to the side of the vehicle 1, it may be impossible to ensure both the predetermined interval Sa and the predetermined intervals Sb. In such a case, the ECU 20 will need to control the position of the vehicle 1 in the width direction by prioritizing one of the predetermined interval Sa and the predetermined intervals Sb. An example of this processing will be described below.

In step S401, the ECU 20 confirms whether the travel speed of the vehicle 1 as the self-vehicle is equal to or higher than a predetermined speed. If the travel speed is equal to or higher than the predetermined speed, the process advances to step S402. Otherwise, the process advances to step S408. As a result, since positional control in the width direction corresponding to the state of the periphery will be performed as described above in only a case in which the vehicle 1 is traveling at a predetermined speed or higher, the ECU 20 will be able to control the position of the vehicle 1 in the width direction as needed. Furthermore, depending on the peripheral environment such as the interval between the self-vehicle and the vehicle traveling alongside the self-vehicle, the sense of oppression felt by an occupant may increase as the speed of the self-vehicle increases. Hence, the ECU 20 can control the position of the vehicle 1 more suitably by performing the positional control in the width direction (to be described later) only when the vehicle 1 is traveling at a predetermined speed or higher. In one embodiment, the value of the predetermined speed may fall within a range of 0 km/h to 30 km/h. Alternatively, in one embodiment, the value of the predetermined speed may fall within a range of 0 km/h to 60 km/h.

If the process has advanced to step S408, the ECU 20 controls the vehicle 1 so that the position of the vehicle 1 in the width direction will be at the center of the lane L1, and ends the processing of this flowchart. In one embodiment, the ECU 20 controls the position of the vehicle 1 in the width direction so that the difference between the actual interval YL1 and the actual interval YR1 will be equal to or less than a threshold. As a result, the vehicle 1 will travel on the center of the lane L1 regardless of the state of the periphery or the like.

In step S402, the ECU 20 confirms whether there is another vehicle traveling, on the adjacent lane, alongside the self-vehicle. If the other vehicle is present, the process advances to step S403. Otherwise, the process advances to step S408. As a result, the ECU 20 will be able to perform positional control in the width direction that corresponds to the state of the periphery only in a case in which another vehicle that is traveling alongside the vehicle 1 is present. For example, the ECU 20 confirms the presence/absence of the other vehicle 99 traveling alongside the self-vehicle based on the result of processing to recognize another vehicle performed in step S1.

In step S403, the ECU 20 confirms whether both the predetermined interval Sa and the predetermined intervals Sb can be ensured for the vehicle 1. If both types of intervals can be ensured, the process advances to step S404. Otherwise, the process advances to step S405. Note that FIG. 2 described above shows a state in which the predetermined interval Sa and the predetermined intervals Sb are ensured for the vehicle 1.

In step S404, the ECU 20 controls the position in the width direction so as to ensure both the predetermined interval Sa and the predetermined intervals Sb, and ends the processing of this flowchart. In one embodiment, the ECU 20 will control the position of the vehicle 1 in the width direction so that a state in which the actual interval X1>the predetermined interval Sa, the actual interval YL1>the predetermined interval Sb, and the actual interval YR1>the predetermined interval Sb will be completely satisfied. As a result, the vehicle 1 can travel by maintaining a predetermined distance to the other vehicle traveling alongside the self-vehicle while also maintaining a predetermined distance to each boundary of the lane L1.

In step S405, the ECU 20 confirms whether the other vehicle 99 has crossed the lane boundary. If the other vehicle has crossed the lane boundary, the process advances to step S406. Otherwise, the process advances to step S407. More specifically, the ECU 20 confirms, based on the recognition results of steps S1 and S2, whether the other vehicle 99 has crossed the lane boundary line 50 and entered the side of the lane L1.

In step S406, the ECU 20 controls the position of the vehicle 1, as the self-vehicle, in the width direction to preferentially ensure the predetermined interval Sa, and ends the processing of this flowchart.

As shown in FIG. 5A, if the other vehicle 99 has crossed the lane boundary line 50 and entered the lane L1, the vehicle 1 will need to ensure a larger interval between the self-vehicle and the other vehicle 99 to avoid contact with the other vehicle 99. Hence, the ECU 20 will control the position of the vehicle 1 in the width direction by prioritizing the predetermined interval Sa (YES in step S405 step S406). In this case, although it will be impossible to ensure the predetermined interval Sb because an actual interval YL2<the predetermined interval Sb on the left side of the vehicle 1, it will be possible to reduce the possibility of contact with the other vehicle 99.

In step S407, the ECU 20 controls the position of the vehicle 1, as the self-vehicle, in the width direction by preferentially ensuring the predetermined interval Sb, and ends the processing of this flowchart.

As shown in FIG. 5B, the possibility of contact between the vehicle 1 and the other vehicle 99 is low in a case in which the other vehicle 99 has not crossed the lane boundary line 50 compared to a case in which the other vehicle 99 has crossed the lane boundary line 50. Hence, the ECU 20 will control the position of the vehicle 1 in the width direction by prioritizing the predetermined interval Sb (NO in step S405 step S407). In this case, an actual interval X3 predetermined interval Sa. Although the predetermined interval Sa cannot be ensured, since the interval between the self-vehicle and the road edge line 52 can be ensured, it will be possible to avoid an obstacle or the like more effectively when such an obstacle or the like has appeared from outside of the road.

As described above, according to this processing example, since the position of the vehicle 1, as the self-vehicle, in the width direction can be controlled in accordance with the state of the other vehicle 99 which is traveling alongside the self-vehicle, the interval between the self-vehicle and the other vehicle traveling alongside on an adjacent lane can be suitably controlled, <Processing Example 2 of Travel Position Control>

FIG. 6 is a flowchart showing an example of processing by the ECU 20, and shows a more specific example of the processing of step S4 of FIG. 3. In addition, FIG. 7 is a view schematically showing the positional relationship between the vehicle 1, the other vehicle 99 traveling alongside the vehicle 1, and each division line, and is a view showing an example of a six-lane road.

In a case in which the vehicle 1 is traveling on a six lane road and is traveling in a lane other than the lane closest to the oncoming lane and the lane closest to the outside of the road, a lane with the same direction of travel will be present on both sides of the vehicle 1. In the example shown in FIG. 7, the vehicle 1 is traveling in the center of the lane L1 and the other vehicle 99 is traveling on the lane L2 on the side of the oncoming lane of the six lane road. Also, in the example of FIG. 7, the lane L1 and a lane 13 are divided by a lane boundary line 54, and the lane L3 and its outside are divided by a road edge line 55.

Figure 7:
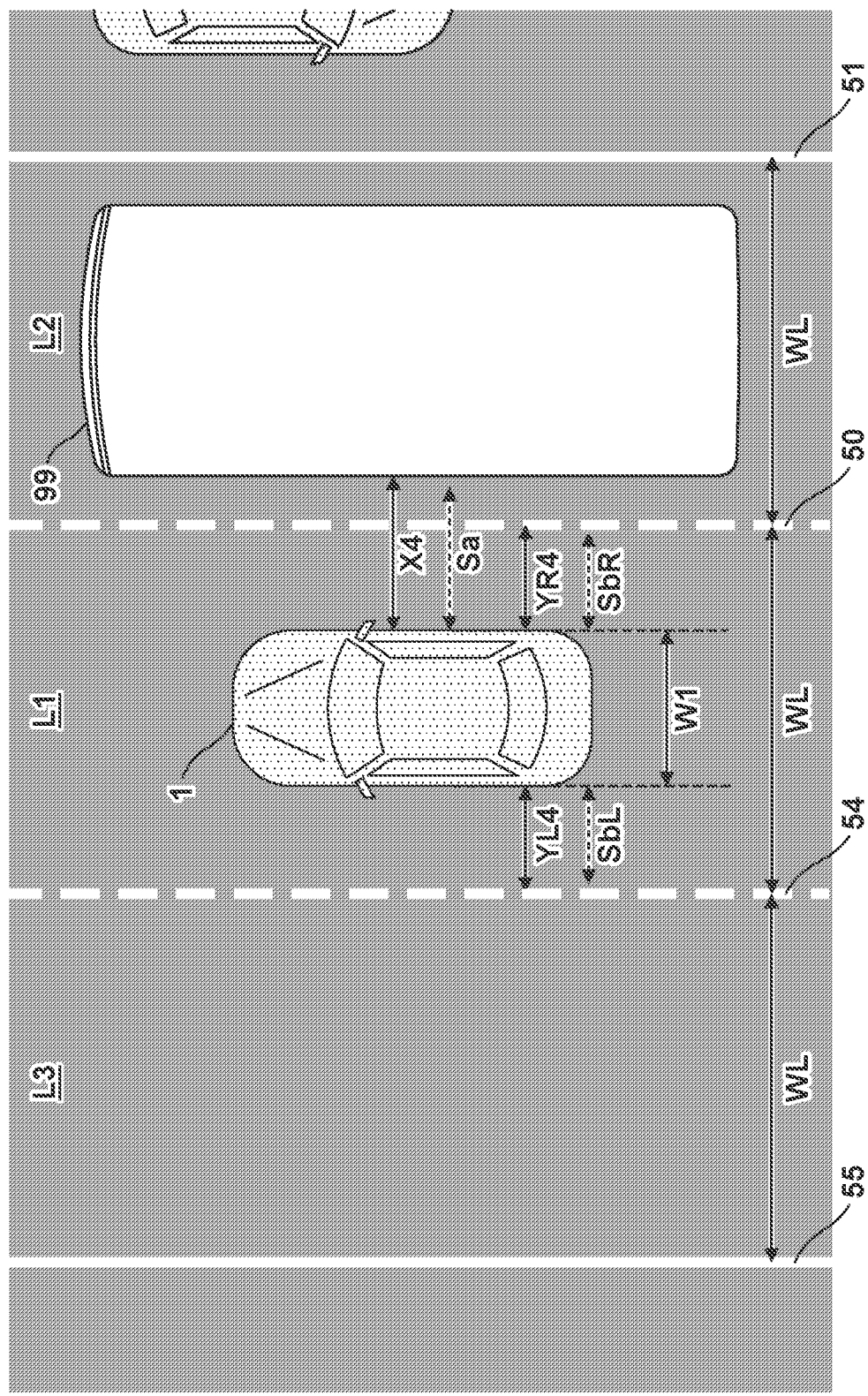
FIG. 7 is a view schematically showing the positional relationship between the vehicle, the other vehicle traveling alongside the vehicle, and each division line.

Differing from the states shown in FIGS. 5A and 5B, the vehicle 1 can change lanes to the lane L3 even if the other vehicle 99 has come closer to the side of the vehicle 1 in the state shown in FIG. 7. Also, since the lane L3 is sandwiched between the vehicle 1 and the outside of the road, there is less possibility that the vehicle 1 will come into contact with an obstacle or the like which is present outside of the road even if the vehicle 1 gets closer to the side of the lane L3 within the lane L1. Hence, in the example of this processing shown in FIG. 6, in a case in which the other vehicle 99 has come closer to the side of the vehicle 1, the ECU 20 will control the position in the width direction in accordance with whether an adjacent lane is present on a side opposite to the side on which the other vehicle 99 is present.

Although the contents of the processes of steps S401 to S408 of this processing example are similar as those of the processing example of FIG. 4, it differs from the processing of FIG. 4 in the point that the process of step S411 will be executed when "NO" is determined in step S405. A description of contents similar to those of the processing of FIG. 4 will be omitted below.

In step S405, the ECU 20 confirms whether the other vehicle 99 has crossed the lane boundary. If the other vehicle has crossed the lane boundary, the process advances to step S406. Otherwise, the process advances to step S411.

In step S411, the ECU 20 confirms whether there is the travel lane L3 on the side opposite to the lane L2 on which the other vehicle 99 is traveling. If the travel lane L3 is "present" on the opposite side, the process advances to step S407. Otherwise, the process advances to step S406. That is, in a case in which there is the lane L3 which is adjacent to a side opposite to the side on which the other vehicle 99 of the lane L1 is traveling as shown in FIG. 7, the ECU 20 will control the position of the vehicle 1 in the width direction so as to preferentially ensure the predetermined interval Sa even if the other vehicle 99 has not crossed the lane boundary line 50. Even if the vehicle 1 gets closer to the left side within the lane L1, the possibility that the vehicle 1 will come into contact with an obstacle or the like which is outside the road is low due to the presence of the lane L3. Hence, by making the vehicle 1 move closer to the left side (the side of the lane L3) before the other vehicle 99 crosses the lane boundary line 50, the interval between the vehicle 1 and the other vehicle 99 can be maintained suitably.

According to this processing example, the position of the self-vehicle in the width direction can be suitably controlled in accordance with the state of the road on the side opposite to the lane on which the other vehicle is traveling.

<Processing Example 3 of Travel Position Control>

Figure 8:
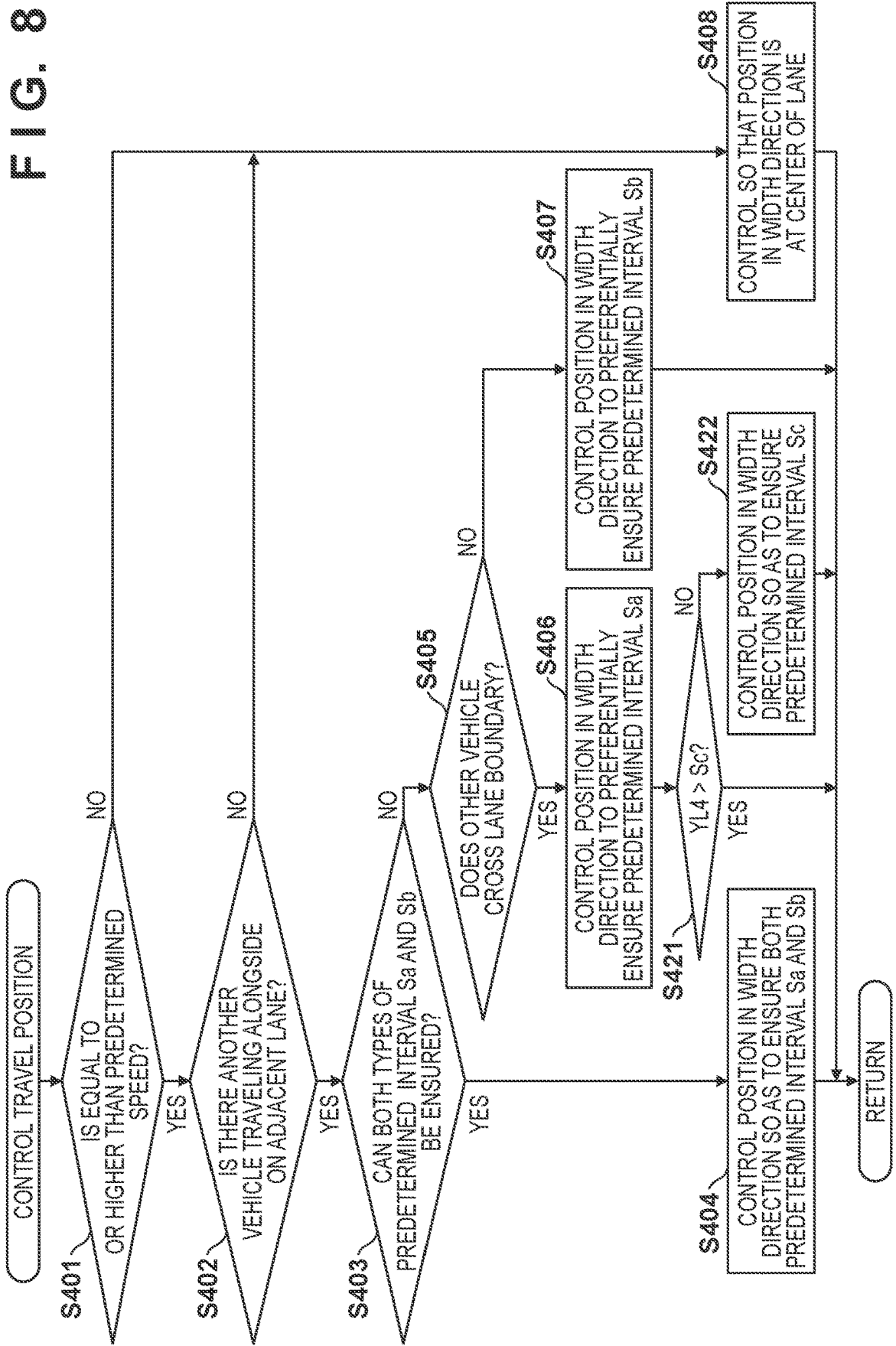
FIG. 8 is a flowchart showing an example of processing by the ECU.

FIG. 8 is a flowchart showing an example of processing by the ECU 20, and shows a more specific example of step S4 of FIG. 3.

In a case in which the other vehicle 99 has crossed the lane boundary line 50 from a state shown in FIG. 2 and has entered the lane L1, the vehicle 1 may end up crossing the road edge line 52 if the predetermined interval Sa continues to be preferentially ensured. In such a case, the vehicle 1 may come into contact with an obstacle or the like which is present outside of the road or may come into contact with a guardrail or a step which is serving as the road boundary. Hence, this processing example will describe an example in which the minimum predetermined interval Sc will be ensured between the self-vehicle and the lane boundary on the side opposite to the side of the other vehicle 99 even in a case in which the predetermined interval Sa is to be preferentially ensured.

Although the contents of the processes of steps S401 to S408 of this processing example are similar as those of the processing example of FIG. 4, it differs from the processing of FIG. 4 in the point that the processes of steps S421 and S422 will be executed after step S406. A description of contents similar to those of the processing of FIG. 4 will be omitted below.

After step S406, the ECU 20 confirms, in step S421, whether an actual interval YL4>the predetermined interval Sc. If the actual interval YL4 is smaller than the predetermined interval Sc, the processing of this flowchart ends. Otherwise, the process advances to step S422. In step S422, the ECU 20 controls the position of the self-vehicle in the width direction so as to ensure the predetermined interval Sc and ends the processing of this flowchart.

In this processing example, if preferentially ensuring the predetermined interval Sa will prevent the predetermined interval Sc from being ensured, the ECU 20 will ensure the predetermined interval Sc. As a result, the minimum interval between the vehicle 1 and the road edge line 52, which is a boundary on the side opposite to the other vehicle 99, can be ensured while prioritizing the interval between the vehicle 1 and the other vehicle 99. Note that the processing operations of the processing examples 2 and 3 of the travel position control may be combined.

<Processing Example 1 of Predetermined Interval Change>

FIG. 9A is a flowchart showing processing by the ECU 20, and shows a more specific example of processing of step S3 of FIG. 3.

In step S301, the ECU 20 confirms whether there is a lane on both sides of the travel lane L1 of the vehicle 1 which is the self-vehicle. If there is a lane on both sides of the vehicle 1 (see FIG. 7), the ECU 20 will cause the process to advance to step S302. Otherwise, the ECU 20 will end the processing of this flowchart without changing the predetermined interval Sa and the predetermined intervals Sb.

In step S302, the ECU 20 changes the predetermined intervals Sb so that the predetermined interval Sb on the side of the passing lane will be larger. In terms of the example shown in FIG. 7, the left and right predetermined intervals Sb are changed so that the predetermined interval Sb on the right side of the vehicle 1 will be larger than the predetermined interval Sb on the left side of the vehicle 1.

Since the predetermined interval Sb on the side of the passing lane, in which the speed of the other vehicle 99 tends to increase, will be increased, the position of the vehicle 1 can be controlled more suitably while ensuring the interval between the self-vehicle and the other vehicle.

<Processing Example 2 of Predetermined Interval Change>

FIG. 9B is a flowchart showing processing by the ECU 20, and shows a more specific example of processing of step S3 of FIG. 3.

In step S311, the ECU 20 confirms whether the positional relationship in the direction of travel with the other vehicle 99, which is a vehicle traveling alongside the self-vehicle, has changed. If the positional relationship has changed, the ECU 20 causes the process to advance to step S312. Otherwise, the processing of this flowchart ends. In one embodiment, the ECU 20 will confirm, based on the recognition result obtained in step S1, whether the amount of overlap between the vehicle 1 and the other vehicle 99 in the front-and-rear direction has changed.

In step S312, the ECU 20 changes the predetermined interval Sa, and the processing of this flowchart ends. In one embodiment, the ECU 20 will change the predetermined interval Sa so that the predetermined interval Sa will increase as the overlap between the vehicle 1 and the other vehicle 99 in the front-and-rear direction increases.

According to this processing example, an interval can be ensured as needed between the vehicle 1 and the other vehicle 99 traveling on the adjacent lane. Also, the occupant may feel a sense of oppression or the like more easily as the overlap between the vehicle 1 and the other vehicle 99 in the front-and-rear direction increases. Hence, by increasing the predetermined interval Sa in accordance with the increase in the overlap between the vehicle 1 and the other vehicle 99, the sense of oppression felt by the occupant can be reduced more effectively.

<Processing Example 3 of Predetermined Interval Change>

FIG. 9C is a flowchart showing processing by the ECU 20, and shows a more specific example of processing of step S3 of FIG. 3.

In step S321, the ECU 20 confirms whether the lane width WL of the lane L1 on which the vehicle 1 is traveling has changed. If the lane width WL has changed, the ECU 20 causes the process to advance to step S322. If the lane width WL has not changed, the processing of this flowchart ends. In one embodiment, the ECU 20 may determine, based on the recognition result obtained in step S2, that the lane width WL has not changed in a case in which the change of the lane width WL is equal to or less than a threshold, and determine that the lane width WL has changed in a case in which the change in the lane width WL exceeds the threshold.

In step S322, the ECU 20 changes the predetermined interval Sa and the predetermined intervals Sb, and the processing of this flowchart ends. In one embodiment, the ECU 20 may change the predetermined interval Sa and the predetermined intervals Sb so that the predetermined interval Sa and the predetermined intervals Sb will increase as the lane width WL increases.

According to this processing example, since the position of the vehicle 1 as the self-vehicle in the width direction is changed more suitably in accordance with the lane width WL of the lane L1, the position of the vehicle 1 can be controlled more suitably in accordance with the lane width WL.

Note that in step S3, one of the processing examples 1 to 3 of the predetermined interval change may be executed or two or all of the processing examples 1 to 3 may be executed in series or in parallel. Furthermore, processing other than the above-described processing examples 1 to 3 may also be included.

As described above, since the position of the vehicle 1 as the self-vehicle in the width direction can be controlled in accordance with the state of the other vehicle 99 that is traveling alongside the self-vehicle, the interval between the vehicle 1 and the other vehicle 99 traveling on an adjacent lane can be controlled suitably.

Note that the predetermined interval Se may be changed appropriately in accordance with the type of the boundary on the side opposite to the side on which the other vehicle 99 is present of the lane L1. If the boundary on the left side of the lane L1 is the lane boundary line 54 or the like as in the example shown in FIG. 7 or the like according to the above-described embodiment, the predetermined interval Se need not be set too large because the vehicle 1 will be able to make a lane change to the lane L3 on the left side. On the other hand, if the boundary on the left side of the lane L1 is the road edge line 52 or a road boundary such as a guardrail, a step, or the like as shown in FIG. 2 or the like according to the above-described embodiment, the predetermined interval Sc needs to be set wide enough to a certain extent because the space on the left side of the vehicle to which the vehicle 1 can move over will be small. Therefore, the ECU 20 may set the predetermined interval Sc of a case in which the boundary on the side opposite to the side on which the other vehicle 99 is present in the lane L1 to be larger than the predetermined interval Sc of a case in which the boundary is a lane boundary line. As a result, the predetermined interval Sc can be set in accordance with the state of the road on the side opposite to the other vehicle 99.

<Summary of Embodiment>

The above-described embodiment discloses at least a travel control apparatus, a vehicle, a travel control method, and a program.

1. A travel control apparatus (for example, 20) according to the above-described embodiment, comprises:
- a first recognition unit (for example, S1) configured to recognize another vehicle present on a second lane which is adjacent to a first lane on which a self-vehicle is traveling;
- a second recognition unit (for example, S2) configured to recognize a boundary of the first lane; and
- a control unit (for example, S4, S404) configured to control, in a case in which the self-vehicle and the other vehicle are traveling alongside each other, a position of the self-vehicle in a width direction so as to ensure a first predetermined interval between the self vehicle and the other vehicle and to ensure a second predetermined interval between the self-vehicle and the boundary of the first lane,
- wherein in a case in which both the first predetermined interval and the second predetermined interval cannot be ensured, the control unit controls the position of the self-vehicle in the width direction to preferentially ensure the first predetermined interval when the other vehicle has crossed a first boundary between the first lane and the second lane (for example, S406) and to preferentially ensure the second predetermined interval when the other vehicle has not crossed the first boundary (for example, S407).

According to this embodiment, the interval between a self-vehicle and another vehicle traveling on an adjacent lane can be controlled more suitably because the position of the self-vehicle in the width direction is controlled in accordance with the state of the vehicle traveling alongside the self-vehicle.

2. According to the above-described embodiment, in a case in which a third lane which is adjacent to a side opposite to a side adjacent to the second lane of the first lane is present, the control unit controls the position of the self-vehicle in the width direction so as to preferentially ensure the first predetermined interval even if the other vehicle has not crossed the first boundary between the first lane and the second lane (for example, S411, S406).

According to this embodiment, the position of the self-vehicle in the width direction can be controlled in accordance with the state of the road on the side opposite to the lane on which the other vehicle is traveling.

3. According to the above-described embodiment, in a case in which a third lane which is adjacent to a side opposite to a side adjacent to the second lane of the first lane is present, the control unit controls the position of the self-vehicle in the width direction so that so that a second predetermined interval on the side of a passing lane a side of the second lane or a side of the third lane will be larger than a second predetermined interval on a side which is not the passing lane (for example, S301, S302).

According to this embodiment, since the second predetermined interval on the side of the passing lane in which the speed of the other vehicle tends to increase will be increased, the interval between the self-vehicle and the other vehicle can be controlled more suitably.

4. According to the above-described embodiment, the control unit controls the position in the width direction in case in which a travel speed of the self-vehicle is not less than a predetermined speed (for example, S401).

According to this embodiment, the interval between the self-vehicle and the other vehicle traveling on the adjacent lane can be controlled as needed.

5. According to the above-described embodiment, the control unit changes the first predetermined interval in accordance with a positional relationship in a direction of travel with the other vehicle traveling alongside the self-vehicle (for example, S311, S312).

According to this embodiment, the interval between the self-vehicle and the other vehicle traveling on the adjacent lane can be controlled as needed.

6. According to the above-described embodiment, the control unit changes the first predetermined interval so as to increase the first predetermined interval as an overlap between the self-vehicle and the other vehicle increases in a front-and-rear direction (for example, S311, S312).

According to this embodiment, the first predetermined interval can be increased when an overlap which has a possibility of interference with the other vehicle is large.

7. According to the above-described embodiment, the control unit further changes the first predetermined interval and the second predetermined interval accordance with a width of the first lane (for example, S321, S322).

According to this embodiment, the position of the self-vehicle in the width direction can be controlled suitably in accordance with the width of the lane.

8. According to the above-described embodiment, even in a case in which the first predetermined interval is to be preferentially ensured, the control unit control the position of the self-vehicle in the width direction so as to ensure a third predetermined interval which is smaller than the second predetermined interval and is between the self-vehicle and a second boundary on a side opposite to the first boundary of the first lane (for example, S421, S422).

According to this embodiment, a minimum interval between the self-vehicle and the boundary on the side opposite to the other vehicle can be ensured even while prioritizing the interval between the self-vehicle and the other vehicle.

9. According to the above-described embodiment, the second recognition unit can recognize, as boundaries of the first lane, a road boundary and lane markings between lanes, and
- the third predetermined interval of a case in which the second boundary is the road boundary is larger than the third predetermined interval of a case in which the second boundary is the lane markings.

According to this embodiment, the third predetermined interval can be changed in accordance with the state of the side opposite to the other vehicle.

10. A vehicle (for example, 1) according to the above-described embodiment comprises a travel control apparatus of 1 to 9 described above.

According to this embodiment, a vehicle that can more suitably control the interval between the self-vehicle and another vehicle traveling on an adjacent lane is provided.

A travel control method according to the above-described embodiment, comprises:

recognizing another vehicle present on a second lane which is adjacent to a first lane on which a self-vehicle is traveling (for example, S1), recognizing a boundary of the first lane (for example, S2); and controlling, in a case in which the self-vehicle and the other vehicle are traveling alongside each other, a position of the self-vehicle in a width direction so as to ensure a first predetermined interval between the self-vehicle and the other vehicle and to ensure a second predetermined interval between the self-vehicle and the boundary of the first lane (for example, S4, S404), wherein in a case in which both the first predetermined interval and the second predetermined interval cannot be ensured, the position of the self-vehicle in the width direction is controlled in the controlling to prioritize ensuring of the first predetermined interval when the other vehicle has crossed a first boundary between the first lane and the second lane (for example, S406) and to prioritize ensuring of the second predetermined interval when the other vehicle has not crossed the first boundary (for example, S407).

According to this embodiment, the interval between a self-vehicle and another vehicle traveling on an adjacent lane can be controlled more suitably because the position of the self-vehicle in the width direction is controlled in accordance with the state of the vehicle traveling alongside the self-vehicle.

12. The above-described program causes a computer of a travel control apparatus to function as each unit of a first recognition unit configured to recognize another vehicle present on a second lane which is adjacent to a first lane on which a self-vehicle is traveling (for example, S1);

a second recognition unit configured to recognize a boundary of the first lane (for example, S2); and a control unit configured to control, in a case in which the self-vehicle and the other vehicle are traveling alongside each other, a position of the self-vehicle in a width direction so as to ensure a first predetermined interval between the self-vehicle and the other vehicle and to ensure a second predetermined interval between the self-vehicle and the boundary of the first lane (for example, S4, S404), wherein in a case in which both the first predetermined interval and the second predetermined interval cannot be ensured, the control unit controls the position of the self-vehicle in the width direction to preferentially ensure the first predetermined interval when the other vehicle has crossed a first boundary between the first lane (for example, S406) and the second lane and to preferentially ensure the second predetermined interval when the other vehicle has not crossed the first boundary (for example, S407).

According to this embodiment, the interval between a self-vehicle and another vehicle traveling on an adjacent lane can be controlled more suitably because the position of the self-vehicle in the width direction is controlled in accordance with the state of the vehicle traveling alongside the self-vehicle.

The invention is not limited to the foregoing embodiments, and various variations/changes are possible within the spirit of the invention.

What is claimed is:

1. A travel control apparatus comprising:

at least one processor circuit with a memory comprising instructions, that when executed by the at least one processor circuit, cause the at least one processor circuit to at least:

recognize another vehicle present on a second lane which is adjacent to a first lane on which a self-vehicle is traveling;

recognize a boundary of the first lane; and control, in a case in which the self-vehicle overlaps at least a portion of the other vehicle in a front-and-rear direction, a position of the self-vehicle in a width direction so as to ensure a first predetermined interval between the self-vehicle and the other vehicle and to ensure a second predetermined interval between the self-vehicle and the boundary of the first lane, wherein the boundary of the first lane includes a first boundary between the first lane and the second lane, and a second boundary on a side opposite to the first boundary of the first lane, and wherein in a case in which both the first predetermined interval and the second predetermined interval cannot be ensured, the position of the self-vehicle is controlled in the width direction to ensure the first predetermined interval when the other vehicle has crossed the first boundary and to ensure the second predetermined interval when the other vehicle has not crossed the first boundary.

2. The apparatus according to claim 1, wherein in a case in which a third lane which is adjacent to the second boundary is present, the position of the self-vehicle is controlled in the width direction so as to ensure the first predetermined interval without ensuring the second predetermined interval even if the other vehicle has not crossed the first boundary between the first lane and the second lane.

3. The apparatus according to claim 1, wherein the second predetermined interval includes a first-boundary-side-predetermined-interval between the self-vehicle and the first boundary and a second-boundary-side-predetermined-interval between the self-vehicle and the second boundary, wherein in a case in which a third lane which is adjacent to the second boundary is present and the second lane is located on a center side of a road rather than the third lane, the position of the self-vehicle is controlled in the width direction so that the first-boundary-side-predetermined-interval will be larger than the second-boundary-side-predetermined-interval, in a case in which the third lane is present and the third lane is located on the center side of the road rather than the second lane, the position of the self-vehicle is controlled in the width direction so that the second-boundary-side-predetermined-interval will be larger than the first-boundary-side-predetermined-interval.

4. The apparatus according to claim 1, wherein the position of the self-vehicle is controlled in the width direction in a case in which the self-vehicle overlaps at least the portion of the other vehicle in the front-and-rear direction and a travel speed of the self-vehicle is not less than a predetermined speed, and wherein, even in a case in which the self-vehicle overlaps at least the portion of the other vehicle in the front-and-rear direction, in a case in which a travel speed of the self-vehicle is less than a predetermined speed, the position of the self-vehicle is not controlled in the width direction.

5. The apparatus according to claim 1, wherein when executed by the at least one processor circuit, the instructions further cause the at least one processor circuit to at least change the first predetermined interval in accordance with a positional relationship in a direction of travel with the other vehicle that the self-vehicle at least partially overlaps.

6. The apparatus according to claim 5, wherein when executed by the at least one processor circuit, the instructions further cause the at least one processor circuit to at least change the first predetermined interval so as to increase the first predetermined interval as an overlap between the self-vehicle and the other vehicle increases in a front-and-rear direction.

7. The apparatus according to claim 1, wherein when executed by the at least one processor circuit, the instructions further cause the at least one processor circuit to at least change the first predetermined interval and the second predetermined interval in accordance with a width of the first lane.

8. The apparatus according to claim 1, wherein even in a case in which the first predetermined interval is to be ensured, in case in which both the first predetermined interval and a third predetermined interval which is smaller than the second predetermined interval cannot be ensured, the position of the self-vehicle is controlled in the width direction so as to ensure the third predetermined interval without ensuring the first predetermined interval.

9. The apparatus according to claim 8, wherein boundaries of the first lane comprise a road boundary and lane markings between lanes, and
the third predetermined interval of a case in which the second boundary is the road boundary is larger than the third predetermined interval of a case in which the second boundary is the lane markings.

10. A vehicle comprising a travel control apparatus according to claim 1.

11. A travel control method comprising:
recognizing another vehicle present on a second lane which is adjacent to a first lane on which a self-vehicle is traveling;
recognizing a boundary of the first lane; and
controlling, in a case in which the self-vehicle overlaps at least a portion of the other vehicle, a position of the self-vehicle in a width direction so as to ensure a first predetermined interval between the self-vehicle and the other vehicle and to ensure a second predetermined interval between the self-vehicle and the boundary of the first lane,
wherein the boundary of the first lane includes a first boundary between the first lane and the second lane, and a second boundary on a side opposite to the first boundary of the first lane, and
wherein in a case in which both the first predetermined interval and the second predetermined interval cannot be ensured, the position of the self-vehicle in the width direction is controlled in the controlling to ensure the first predetermined interval when the other vehicle has crossed the first boundary and to ensure the second predetermined interval when the other vehicle has not crossed the first boundary.

12. A non-transitory computer-readable storage medium storing a program for causing a computer of a travel control apparatus to at least:
recognize another vehicle present on a second lane which is adjacent to a first lane on which a self-vehicle is traveling;
recognize a boundary of the first lane; and
control, in a case in which the self-vehicle overlaps at least a portion of the other vehicle in a front-and-rear direction, a position of the self-vehicle in a width direction so as to ensure a first predetermined interval between the self-vehicle and the other vehicle and to ensure a second predetermined interval between the self-vehicle and the boundary of the first lane,
wherein the boundary of the first lane includes a first boundary between the first lane and the second lane, and a second boundary on a side opposite to the first boundary of the first lane, and
wherein in a case in which both the first predetermined interval and the second predetermined interval cannot be ensured, the position of the self-vehicle is controlled in the width direction to ensure the first predetermined interval when the other vehicle has crossed the first boundary and to ensure the second predetermined interval when the other vehicle has not crossed the first boundary.

* * * * *